R. C. PIERCE.
ELECTRIC WELDING MACHINE.
APPLICATION FILED SEPT. 30, 1911.

1,046,639.

Patented Dec. 10, 1912.

WITNESSES.
C. E. Walker.
M. L. Oppenheim.

INVENTOR.
Robert Clark Pierce,
By Owen & Owen,
His attys.

UNITED STATES PATENT OFFICE.

ROBERT CLARK PIERCE, OF CINCINNATI, OHIO, ASSIGNOR TO THE TOLEDO ELECTRIC WELDER COMPANY, OF CINCINNATI, OHIO, A CORPORATION OF OHIO.

ELECTRIC WELDING-MACHINE.

1,046,639.     Specification of Letters Patent.     Patented Dec. 10, 1912.

Application filed September 30, 1911. Serial No. 652,162.

*To all whom it may concern:*

Be it known that I, ROBERT CLARK PIERCE, a citizen of the United States, and a resident of Cincinnati, in the county of Hamilton, State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to electric welding machines, and particularly to box welding machines or the like, but is not restricted to such use as it may be used in any connection for which it is adapted or appropriate.

The object of my invention is to improve upon welding machines of this character to facilitate an adjusting of the dies thereof as the nature and shape of the work operated on may require, thus enhancing the practicability and commercial value thereof.

The invention is fully described in the following specification, and while in its broader aspect, it is capable of embodiment in numerous forms, two embodiments thereof are illustrated in the accompanying drawings, in which,—

Figure 1:
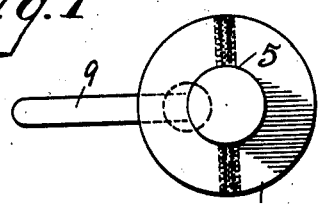
Figure 2:
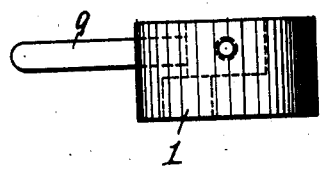
Figure 3:
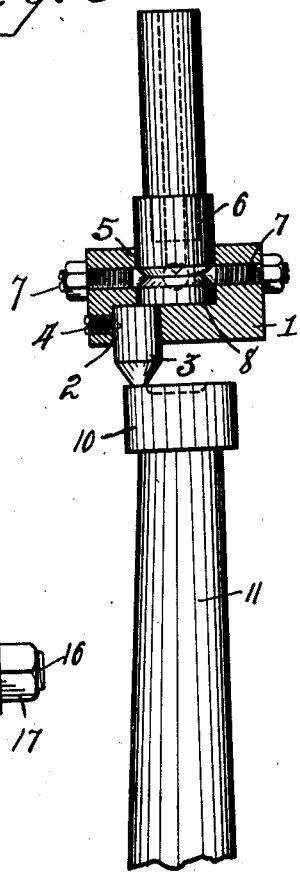
Figure 4:
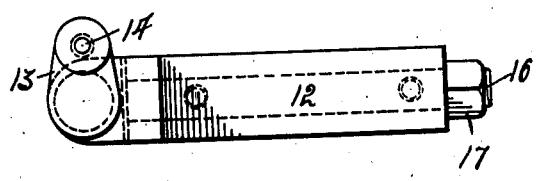
Figure 5:
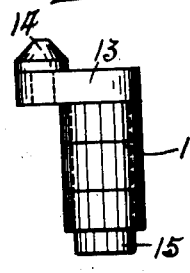
Figure 6:
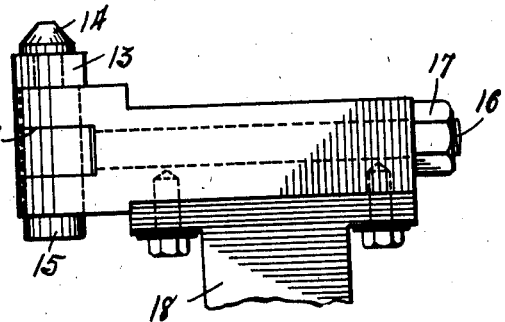

Figures 1 and 2 are top plan and side views, respectively, of one form of my adjustable die-carrying head. Fig. 3 is a cross-section thereof with a die or welding point in position therein and in association with a companion die, and Figs. 4, 5 and 6 are plan, end and side views, respectively, of another form of my invention.

Referring to Figs. 1 to 3 of the drawings, 1 designates a die-carrying head, which may be of circular or other suitable form, and is provided in the present instance on the under side thereof with a socket 2 in which a welding die or point 3 is secured, as by a set-screw 4. The upper side of the head 1, or that opposed to the socket 2, is shown as being provided with a socket 5, which is offset from axial alinement with the die 3 and adapted to loosely receive an end of a shaft or plunger 6, which carries such head and about which the head has swivel movements. The head is shown in the present instance as being retained in swivel engagement with the shaft 6 by screws 7, which are threaded through the walls of said socket and work at their inner ends within an annular recess 8 in the shaft. If the head 1 carries the movable die of a welding machine, the shaft or plunger 6 is secured to the plunger or part controlling the movement of such die, as it is well understood in the art, while it is apparent that if such head carries the stationary die of the set, it may be secured to the stationary horn or other die-carrying part of the machine in any suitable manner. 9 designates a handle which projects radially from the head to facilitate a turning thereof. The welding die with which the swivel die 3 coacts is shown at 10 in Fig. 3 as having a welding surface coextensive with the arc of movement of the die 3 to permit a coaction of the die at any point of adjustment of the swivel die. The die 10 is carried by a horn 11, or other suitable machine part.

In the form shown in Figs. 4, 5 and 6, 12 designates a die-carrying block, which is longitudinally bored and has one end notched as shown at 12′, and 13 a die-arm having the welding point 14 and shank 15 extending in opposite directions therefrom with their axes offset from each other. The shank 15 is adapted to fit loosely within an opening provided transversely through the notched end portion of the block 12 for turning movements therein, and is held in adjusted position by a clamp bolt 16. This bolt has its head fashioned to fit within the notch 12′ of the block, with its head bore in substantial register with said transverse opening for the die shank to project through. The shank of the bolt 16 projects through the block bore and is tightened to clamp the die shank by a turning of a nut 17 thereon against the block end, as is apparent. 18 designates a machine part to which the block 12 may be secured.

It is apparent that I have provided simple and efficient means for permitting a swivel adjustment of a die to facilitate the welding of points in a box or other article at different sides or corners thereof, or for any other purpose for which it may be adapted.

I wish it understood that my invention is not limited to any specific construction or arrangement of the part except in so far as such limitations are specified in the claims.

Having thus described my invention, what I claim as new and desire to secure by Letters Patent, is,—

1. An electric welding machine having a shaft, and a member mounted for turning movements on said shaft and having an electrode off-set from its turning axis.

2. An electric welding machine having a shaft provided with a die carrying head which is revoluble relative thereto, and a die carried by said head at one side of its turning axis.

3. In an electric welding apparatus, a die-carrying head mounted for swivel movements, a die carried by said head at one side of its turning axis, and a handle projecting from said head.

4. In an electric welding apparatus, a die-carrying head having sockets in opposite sides thereof with their axes laterally offset from each other, a die mounted in one of said sockets, a head-carrying member projecting in the other of said sockets, and means for retaining said head and member in swivel engagement.

5. In an electric welding apparatus, a die-carrying swivel head having sockets provided in opposite sides thereof with one off-set from the axis of the other, a die removably carried by one socket, a head-carrying member projecting loosely within the other socket and having a circular race in its peripheral portion, and screws threaded through the walls of said latter socket and projecting at their inner ends within said race.

In testimony whereof, I have hereunto signed my name to this specification in the presence of two subscribing witnesses.

ROBERT CLARK PIERCE.

Witnesses:
 WIRT MACNEALE,
 FRANK WARREN.